United States Patent
Arora et al.

(10) Patent No.: US 7,257,516 B2
(45) Date of Patent: Aug. 14, 2007

(54) METHOD, APPARATUS, AND PROGRAM FOR ELIMINATING THREAD SKEW IN MULTITHREADED PERFORMANCE BENCHMARKS

(75) Inventors: Rajiv Arora, Austin, TX (US); Jesse Mannes Gordon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1434 days.

(21) Appl. No.: 09/956,768

(22) Filed: Sep. 20, 2001

(65) Prior Publication Data

US 2003/0055764 A1    Mar. 20, 2003

(51) Int. Cl.
*H02H 3/05* (2006.01)
(52) U.S. Cl. .................. 702/186; 714/38; 714/47; 718/100; 718/101; 718/102; 370/229; 370/232; 709/200; 709/221
(58) Field of Classification Search ............ 713/1, 713/100, 300; 709/224, 220, 221; 718/100, 718/101, 102; 703/17; 711/137; 714/38, 714/47; 717/124; 702/186; 370/232, 229
See application file for complete search history.

(56) References Cited

U.S. PATENT DOCUMENTS

| | | | | |
|---|---|---|---|---|
| 5,245,638 | A | | 9/1993 | Gustafson ............... 395/575 |
| 5,459,837 | A | | 10/1995 | Caccavale ............ 395/184.01 |
| 6,067,412 | A | * | 5/2000 | Blake et al. ............... 718/102 |
| 6,118,940 | A | | 9/2000 | Alexander, III et al. .... 395/704 |
| 6,154,877 | A | | 11/2000 | Ramkumar et al. ......... 717/11 |
| 6,163,840 | A | | 12/2000 | Chrysos et al. ............ 712/227 |
| 6,185,659 | B1 | * | 2/2001 | Milillo et al. ............. 711/137 |
| 6,249,886 | B1 | * | 6/2001 | Kalkunte ..................... 714/47 |
| 6,345,338 | B1 | * | 2/2002 | Milillo et al. ............. 711/137 |
| 6,360,332 | B1 | | 3/2002 | Weinberg et al. ............ 714/4 |
| 6,449,739 | B1 | | 9/2002 | Landan ....................... 714/47 |
| 6,466,898 | B1 | * | 10/2002 | Chan ........................ 703/17 |
| 6,470,464 | B2 | | 10/2002 | Bertram et al. .............. 714/37 |
| 6,477,483 | B1 | | 11/2002 | Scarlat et al. .............. 702/186 |
| 6,526,504 | B1 | * | 2/2003 | Veazey et al. ................ 713/1 |
| 6,570,911 | B1 | * | 5/2003 | O'Mahony .................. 375/222 |
| 6,735,719 | B2 | | 5/2004 | Moe et al. .................... 714/38 |
| 6,738,933 | B2 | | 5/2004 | Fraenkel et al. ............ 714/47 |
| 6,754,701 | B1 | | 6/2004 | Kessner .................... 709/219 |
| 6,799,213 | B1 | | 9/2004 | Zhao et al. ................ 709/224 |
| 6,826,752 | B1 | * | 11/2004 | Thornley et al. ........... 718/100 |
| 6,961,769 | B2 | * | 11/2005 | Arora et al. ............... 709/224 |
| 2002/0194509 | A1 | * | 12/2002 | Plante et al. ............... 713/300 |
| 2003/0046383 | A1 | | 3/2003 | Lee et al. .................. 709/224 |
| 2003/0055956 | A1 | * | 3/2003 | Arora et al. ............... 709/224 |
| 2003/0149716 | A1 | * | 8/2003 | Peterson ................... 709/101 |
| 2006/0129992 | A1 | * | 6/2006 | Oberholtzer et al. ........ 717/124 |
| 2006/0230317 | A1 | * | 10/2006 | Anderson .................... 714/38 |

\* cited by examiner

*Primary Examiner*—Carol S. W. Tsai
(74) *Attorney, Agent, or Firm*—Duke W. Yee; Marilyn Smith Dawkins; Wayne P. Bailey

(57) ABSTRACT

A data processing system performs a multithreaded performance benchmark with a rampup interval and a rampdown interval. The master thread signals a start test event and begins the rampup interval. After the rampup interval, the master thread signals a start measurement event. In response to the start measurement event, the worker threads record the units of work they complete. After the measurement interval, the master signals the workers to stop measuring, but to continue running. This begins the rampdown interval. After the rampdown interval, the master thread signals a stop test event. The rampup and rampdown intervals are long enough to ensure that measurements are not recorded during skew intervals. Thus, thread skew does not impact the results.

23 Claims, 2 Drawing Sheets

METHOD, APPARATUS, AND PROGRAM FOR ELIMINATING THREAD SKEW IN MULTITHREADED PERFORMANCE BENCHMARKS

RELATED APPLICATIONS

The present application is related to commonly assigned and co-pending U.S. patent application Ser. No. 09/956/767 entitled "METHOD, APPARATUS, AND PROGRAM FOR MEASURING SERVER PERFORMANCE USING MULTIPLE CLIENTS", filed on an even date herewith and hereby incorporated by reference.

BACKGROUND OF THE INVENTION

1. Technical Field

The present invention relates to data processing and, in particular, to performance benchmarks. Still more particularly, the present invention provides a method, apparatus, and program for eliminating thread skew in multithreaded performance benchmarks.

2. Description of Related Art

A benchmark is a test that measures the performance of a system or subsystem on a well-defined task or set of tasks. Benchmarks are commonly used to predict the performance of an unknown system on a known, or at least well-defined, task or workload. Benchmarks can also be used as monitoring and diagnostic tools. By running a benchmark and comparing the results against a known configuration, one can potentially pinpoint the cause of poor performance. Similarly, a developer can run a benchmark after making a change that might impact performance to determine the extent of the impact.

Performance benchmarks are typically designed to time a certain activity of interest for a certain period and compute the performance as either a rate (i.e. units/sec) or as a latency (i.e. sec/unit). However, complications arise if the benchmark is highly multithreaded. If a processor runs tens of threads or more, a phenomenon called thread skew can occur.

With reference to FIG. 1, a diagram illustrating thread skew is shown. In a multithreaded benchmark, a master thread controls multiple worker threads and handles all the timing. While the nominal measurement interval is from the start of the test to the time the test stops, individual worker threads all start or stop some time after the event has been signaled by the master depending on when they are run by the operating system dispatcher. As a result, the measurement interval includes intervals A and B when not all the threads are actually competing with each other. To accurately measure a multithreaded system in steady state operation, it is desirable to reduce intervals A and B to zero; otherwise, the resulting measurement does not truly characterize the system's performance.

One simple solution is to run the test for a very long time, where the measurement interval is much greater than A+B. However, in a highly multithreaded benchmark, this approach may lead to run times of hours rather than minutes. Therefore, it would be advantageous to provide an improved mechanism for eliminating thread skew in multithreaded performance benchmarks.

SUMMARY OF THE INVENTION

The present invention performs a multithreaded performance benchmark with a rampup interval and a rampdown interval. The master thread signals a start test event and begins the rampup interval. After the rampup interval, the master thread signals a start measurement event. In response to the start measurement event, the worker threads record the units of work they complete. After the measurement interval, the master signals the workers to stop measuring, but to continue running. This begins the rampdown interval. After the rampdown interval, the master thread signals a stop test event. The rampup and rampdown intervals are long enough to ensure that measurements are not recorded during skew intervals. Thus, thread skew does not impact the results.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
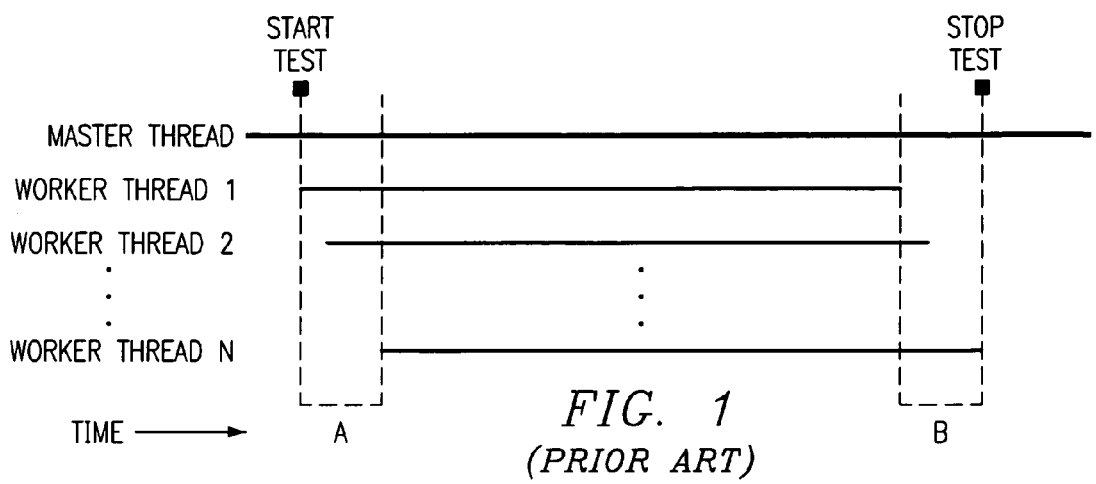
FIG. 1 is a diagram illustrating thread skew.
Figure 2:
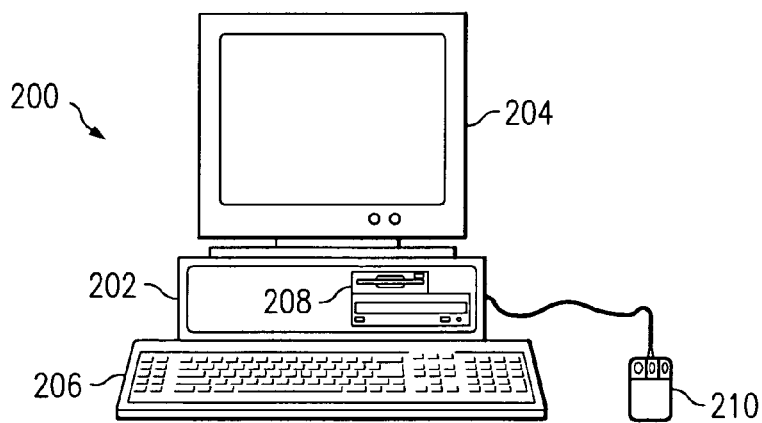
FIG. 2 is a pictorial representation of a data processing system in which the present invention may be implemented in accordance with a preferred embodiment of the present invention.

With reference now to the figures and in particular with reference to FIG. 2, a pictorial representation of a data processing system in which the present invention may be implemented is depicted in accordance with a preferred embodiment of the present invention. A computer 200 is depicted which includes system unit 202, video display terminal 204, keyboard 206, storage devices 208, which may include floppy drives and other types of permanent and removable storage media, and mouse 210. Additional input devices may be included with personal computer 200, such as, for example, a joystick, touchpad, touch screen, trackball, microphone, and the like. Computer 200 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 200 also preferably includes a graphical user interface (GUI) that may be implemented by means of systems software residing in computer readable media in operation within computer 200.

Figure 3:
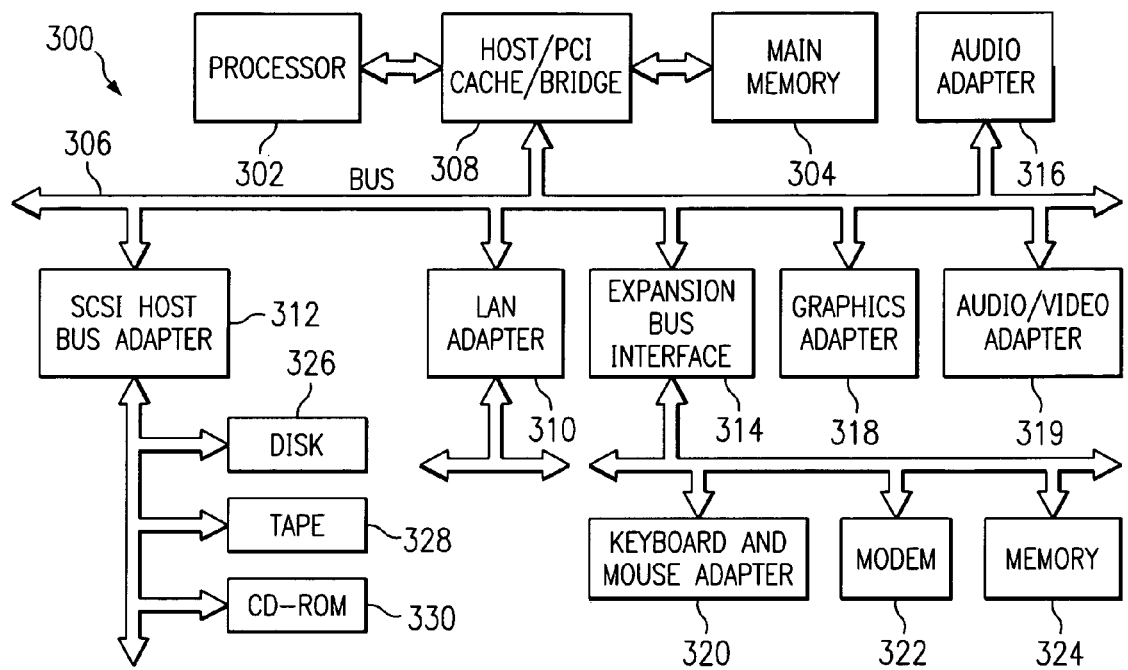
FIG. 3 is a block diagram of a data processing system in which the present invention may be implemented.

With reference now to FIG. 3, a block diagram of a data processing system is shown in which the present invention may be implemented. Data processing system 300 is an example of a computer, such as computer 200 in FIG. 2, in which code or instructions implementing the processes of the present invention may be located. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a personal digital assistant (PDA), which is configured with ROM and/or flash ROM to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The processes of the present invention are performed by processor 302 using computer implemented instructions, which may be located in a memory such as, for example, main memory 304, memory 324, or in one or more peripheral devices 326-330.

In accordance with a preferred embodiment of the present invention, data processing system 300 is configured to run a multithreaded performance benchmark. While the data processing system in FIG. 3 shows a single processor, the present invention is also applicable to multiprocessing systems, particularly if the number of threads in the multithreaded performance benchmark is much greater than the number of processors.

Figure 4:
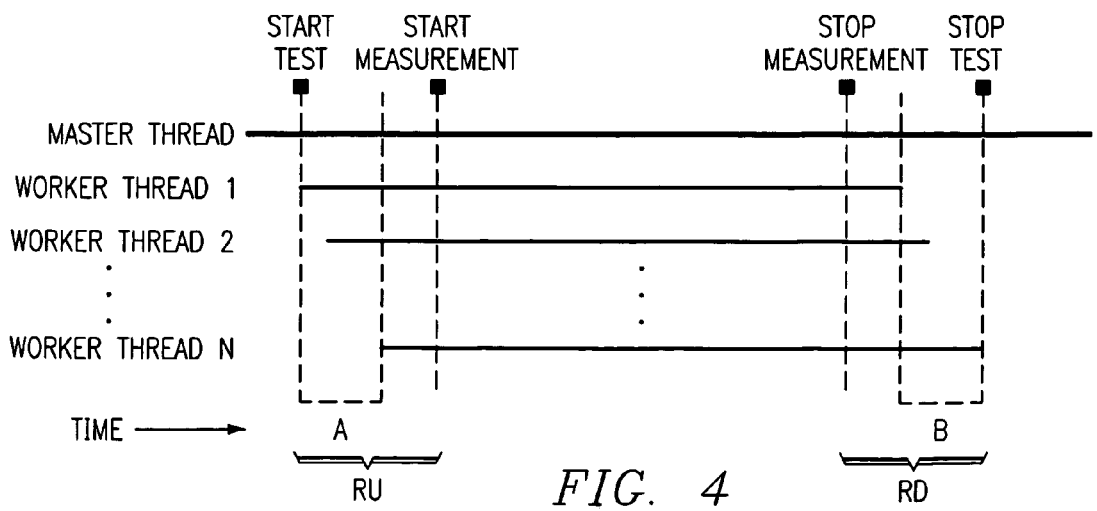
FIG. 4 is a diagram illustrating a mechanism for eliminating thread skew in multithreaded performance benchmarks in accordance with a preferred embodiment of the present invention.

With reference to FIG. 4, a diagram illustrating a mechanism for eliminating thread skew in multithreaded performance benchmarks is shown in accordance with a preferred embodiment of the present invention. A master thread signals a start test event and begins a rampup interval RU. After the rampup interval, the master thread signals a start measurement event. In response to the start measurement event, the worker threads record the units of work they complete. After the measurement interval, the master signals the workers to stop measuring, but to continue running. This begins the rampdown interval RD. After the rampdown interval, the master thread signals a stop test event. The rampup and rampdown intervals are long enough to ensure that measurements are not recorded during skew intervals A and B. Thus, thread skew does not impact the results of the benchmark.

In the preferred embodiment of the present invention, two practical problems must be solved. First, a mechanism for signaling events must be implemented. The simplest and preferred mechanism in a multithreaded environment is a shared memory flag. However, other signaling mechanisms may be used, such as operating system signals. Also, appropriate values for the RU and RD intervals must be determined. A preferred approach sets RU and RD to zero and then increases each value until further increases have no measurable impact on the result. Other approaches for determining RU and RD may be used. For example, RU and RD may be determined as a function of the number of worker threads and/or the desired measurement interval.

Figure 5:
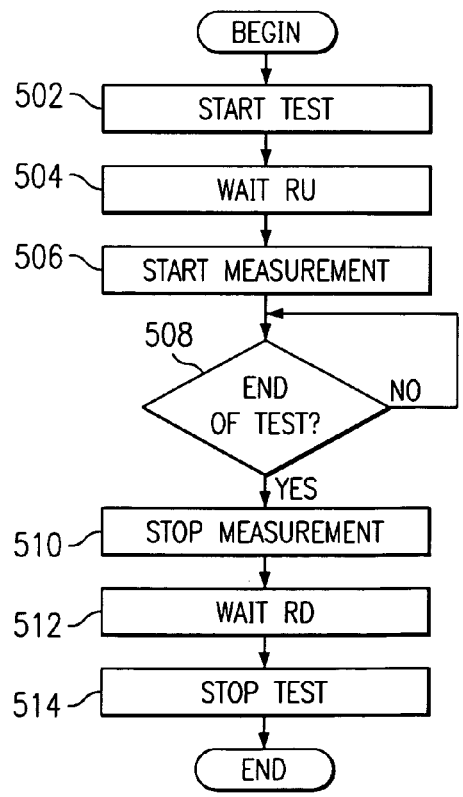
FIG. 5 is a flowchart illustrating a process for eliminating thread skew in multithreaded performance benchmarks in accordance with a preferred embodiment of the present invention.

Turning now to FIG. 5, a flowchart is shown illustrating a process for eliminating thread skew in multithreaded performance benchmarks in accordance with a preferred embodiment of the present invention. The process begins and signals a start test event (step 502). Next, the process waits during a rampup interval (step 504) and signals a start measurement event (step 506). Thereafter, a determination is made as to whether the end of the test or measurement interval is reached (step 508). If the end of the measurement interval is not reached, the process returns to step 508 until the end of the test is reached.

If the end of the measurement interval is reached in step 508, the process signals a stop measurement event (step 510) and waits during a rampdown interval (step 512). At the end of the measurement interval, the worker threads may report their results to the master thread and stop. Then, the process signals a stop test event (step 514) and ends.

A common problem in performance benchmarking of computer systems is the determination of whether the benchmark results have statistically converged. Typically, benchmarks are run repeatedly and the resulting metrics are postprocessed to determine their confidence interval as a percentage of the mean. The confidence interval is a standard statistical computation given a specified confidence level, such as 90% or 95% confidence. The confidence interval is the smallest range under the normal distribution that will just enclose a probability equal to the confidence level, as known in the art. Metrics have converged if the confidence interval is below a specified threshold.

However, many benchmarks yield multiple, equally important metrics. For example, a benchmark may measure the throughput and CPU utilization of a system. If statistical convergence testing is done on a single metric, the result may be misleading or invalid. In accordance with a preferred embodiment of the present invention, the benchmark code determines the statistical convergence of all the relevant metrics and has the benchmark converge only if all of the individual metrics have converged.

Figure 6:
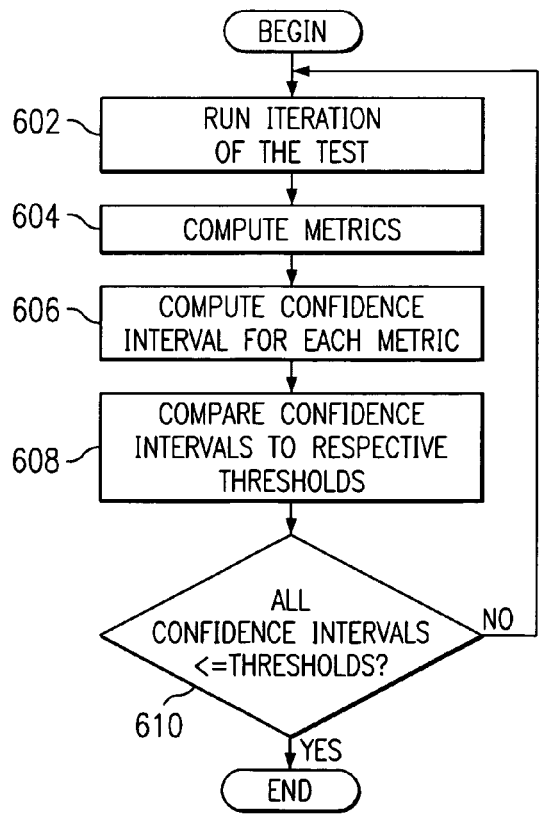
FIG. 6 is a flowchart illustrating a benchmark process with multiple metric convergence in accordance with a preferred embodiment of the present invention.

With reference to FIG. 6, a flowchart illustrating a benchmark process with multiple metric convergence is shown in accordance with a preferred embodiment of the present invention. The process begins and runs an iteration of the test (step 602). Next, the process computes the metrics (step 604) and computes a confidence interval for each metric (step 606). Thereafter, the process compares the confidence intervals to respective thresholds (step 608) and a determination is made as to whether all confidence intervals are less than or equal to their respective thresholds (step 610). If any confidence interval is greater than its respective threshold, the process returns to step 602 to run another iteration of the test. If all confidence intervals are less than or equal to their specified thresholds in step 610, the benchmark has converged and the process ends.

Thus, the present invention solves the disadvantages of the prior art by performing a multithreaded performance benchmark with a rampup interval and a rampdown interval. The rampup and rampdown intervals are long enough to ensure that measurements are not recorded during skew intervals. Thus, thread skew does not impact the results. The present invention also solves the disadvantages of the prior art by converging on multiple metrics, thus providing more accurate and valid results.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system implemented method for performing a benchmark, comprising steps implemented by the data processing system of:
   signaling a start test event and waiting during a rampup interval;
   signaling a start measurement event at the end of the rampup interval;
   responsive to the signaling the start measurement event, collecting measurement results for units of work performed by a plurality of worker threads, the measurement results having mitigated thread skew due to the measurement results being collected responsive to the signaling the start measurement event; and
   signaling a stop test event.

2. The method of claim 1, wherein events are signaled by setting a shared memory flag.

3. The method of claim 1, wherein events are signaled using operating system signals.

4. The method of claim 1, further comprising starting plurality of worker threads during the rampup interval.

5. The method of claim 4, wherein the step of collecting measurement results comprises:
   signaling a stop measurement event; and
   receiving the measurement results from the worker threads.

6. The method of claim 5, further comprising:
   waiting during a rampdown interval after the stop measurement event; and
   signaling the stop test event at the end of the rampdown interval.

7. The method of claim 6, wherein the length of the rampdown interval is determined based on the number of worker threads in the plurality of worker threads.

8. A computer readable medium encoded with a computer program product data structure adapted to perform the steps of claim 1, when said computer program product is run on a data processing system.

9. A data processing system implemented method for performing a benchmark, comprising steps implemented by the data processing system of:
   signaling a start test event;
   starting a plurality of worker threads during a rampup interval;
   signaling a start measurement event at the end of the rampup interval;
   collecting measurement results; and
   signaling a stop test event, wherein the length of the rampup interval is determined based on the number of worker threads in the plurality of worker threads.

10. A data processing system implemented method for performing a benchmark, comprising steps implemented by the data processing system of:
   signaling a start test event;
   waiting during a rampup interval;
   signaling a start measurement event at the end of the rampup interval;
   collecting measurement results;
   signaling a stop test event;

repeatedly increasing the rampup interval and performing the benchmark until the increase of the rampup interval has no measurable impact on the measurement results.

11. A data processing system implemented method for performing a benchmark, comprising steps implemented by the data processing system of:
    signaling a start test event;
    waiting during a rampup interval;
    signaling a start measurement event at the end of the rampup interval;
    collecting measurement results, wherein the step of collecting measurement results comprises repeatedly running an iteration of a test until a plurality of metrics have converged; and
    signaling a stop test event.

12. The method of claim 11, further comprising, for each iteration of the test:
    computing a plurality of metrics;
    computing confidence intervals for each of the plurality of metrics; and
    determining whether each confidence interval is less than a respective threshold, wherein the plurality of metrics have converged if all confidence intervals are less than their respective thresholds.

13. A data processing system implemented method for performing a benchmark, comprising:
    starting a plurality of worker threads;
    waiting during a rampup interval;
    signaling a start measurement event at the end of the rampup interval;
    responsive to the signaling the start measurement event, receiving measurement results from the worker threads, the measurement results having mitigated thread skew due to the measurement results being received responsive to the signaling the start measurement event;
    signaling a stop measurement event;
    waiting during a rampdown interval after the stop measurement event; and
    signaling a stop test event at the end of the rampdown interval.

14. A computer readable medium encoded with a computer program product data structure adapted to perform the steps of claim 13, when said computer program product is run on a data processing system.

15. A data processing machine for performing a benchmark, comprising:
    first signal means for signaling a start test event and waiting during a rampup interval by the data processing machine;
    second signal means for signaling a start measurement event at the end of the rampup interval by the data processing machine;
    collection means, responsive to the second signaling means, for collecting measurement results comprising units of work performed by a plurality of worker threads by the data processing machine; and
    third signal means for signaling a stop test event by the data processing machine.

16. The data processing machine of claim 15, wherein events are signaled by setting a shared memory flag within the data processing machine.

17. The data processing machine of claim 15, wherein events are signaled using operating system signals within the data processing machine.

18. The data processing machine of claim 15, further comprising means for starting the plurality of worker threads during the rampup interval by the data processing machine.

19. The data processing machine of claim 15, wherein the collection means comprises:
    means for signaling a stop measurement event by the data processing machine; and
    means for receiving the measurement results from the worker threads by the data processing machine.

20. The data processing machine of claim 19, further comprising:
    means for waiting during a rampdown interval after the stop measurement event by the data processing machine; and
    means for signaling the stop test event at the end of the rampdown interval by the data processing machine.

21. The data processing machine of claim 15, further comprising:
    means for repeatedly increasing the rampup interval and performing the benchmark by the data processing machine until the increase of the rampup interval has no measurable impact on the measurement results.

22. The data processing machine of claim 15, wherein the collection means comprises:
    iteration means for repeatedly running an iteration of a test by the data processing machine until a plurality of metrics have converged.

23. A data processing machine for performing a benchmark, comprising:
    means for starting a plurality of worker threads by the data processing machine;
    means for waiting during a rampup interval by the data processing machine;
    means for signaling a start measurement event at the end of the rampup interval by the data processing machine;
    means, responsive to the signaling the start measurement event, for receiving measurement results from the worker threads by the data processing machine;
    means for signaling a stop measurement event by the data processing machine;
    means for waiting during a rampdown interval after the stop measurement event by the data processing machine; and
    means for signaling a stop test event at the end of the rampdown interval by the data processing machine.

* * * * *